United States Patent
Cook et al.

(10) Patent No.: US 9,230,277 B2
(45) Date of Patent: *Jan. 5, 2016

(54) PRESENTATION OF PRODUCT RECOMMENDATIONS BASED ON SOCIAL INFORMATICS

(71) Applicant: INTERNATIONAL BUSINESS MACHINES CORPORATION, Armonk, NY (US)

(72) Inventors: Kelly L. Cook, Raleigh, NC (US); Lydia M. Do, Raleigh, NC (US); Eileen Min, Seattle, WA (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/045,365

(22) Filed: Oct. 3, 2013

(65) Prior Publication Data

US 2015/0100452 A1    Apr. 9, 2015

(51) Int. Cl.
G06Q 30/00 (2012.01)
G06Q 30/06 (2012.01)
G06Q 50/00 (2012.01)

(52) U.S. Cl.
CPC ........ G06Q 30/0631 (2013.01); G06Q 30/0619 (2013.01); G06Q 50/01 (2013.01)

(58) Field of Classification Search
CPC ........... G06Q 30/0601–30/0645; G06Q 30/08; G06Q 50/01
USPC .............................................. 705/26.1–27.2
See application file for complete search history.

(56) References Cited

U.S. PATENT DOCUMENTS

| 8,095,432 B1 | 1/2012 | Berman et al. |
| 2008/0134053 A1 | 6/2008 | Fischer |
| 2009/0198562 A1 * | 8/2009 | Wiesinger et al. ............... 705/10 |
| 2010/0153404 A1 * | 6/2010 | Ghosh et al. ................... 707/748 |
| 2010/0262477 A1 * | 10/2010 | Hillerbrand et al. ........ 705/14.16 |
| 2011/0202617 A1 | 8/2011 | Naidu et al. |
| 2011/0258073 A1 | 10/2011 | Lifson |

(Continued)

FOREIGN PATENT DOCUMENTS

EP    2463818 A1    6/2012

OTHER PUBLICATIONS

"Circle-Based Recommendation in Online Social Networks." Yang, Xiwang; Steck, Harald; Liu, Yong. KDD '12. pp. 1267-1275. Aug. 12-16, 2012.*
Anonymous, "Find People and Create Circles—Google+ Help", Google, 2013, pp. 1-3.

(Continued)

Primary Examiner — William Allen
Assistant Examiner — Katherine O'Sullivan
(74) Attorney, Agent, or Firm — Law Office of Jim Boice

(57) ABSTRACT

A method, system, and/or computer program product presents product recommendations based on input derived from a user's social network. A description of a product selected for purchase by a user is received. A social networking site is searched for information relevant to a characterization the product. The relevant information is characterized according to a social relationship between the user and an other member of the social networking site, a product family of the product, and a product expertise of the other member about the product. Characterized information about the product is then presented to the user.

10 Claims, 4 Drawing Sheets

(56) References Cited

U.S. PATENT DOCUMENTS

| | | |
|---|---|---|
| 2012/0179552 A1 | 7/2012 | Tishkevich |
| 2012/0209832 A1 | 8/2012 | Neystadt et al. |
| 2012/0291137 A1 | 11/2012 | Walsh et al. |
| 2012/0316986 A1 | 12/2012 | Levy et al. |
| 2013/0030950 A1 | 1/2013 | Leng |
| 2013/0054407 A1 | 2/2013 | Sabur |
| 2013/0138663 A1 | 5/2013 | Shivashankar et al. |
| 2014/0172630 A1* | 6/2014 | Dogin et al. ........... 705/26.8 |
| 2014/0195370 A1* | 7/2014 | Devasia et al. ........... 705/26.7 |

OTHER PUBLICATIONS

J. O'Dell, "Amazon + Facebook = A Perfect Storm of Recommendations", Mashable.com, Jul. 27, 2010, 3 Pages.

J. Cottone, "A Recommendation Engine for Your Next Ecommerce Project", Freelancermagazine.com, Tone Media LLC, Oct. 17, 2009, pp. 1-4.

C. Jordan, "Product Recommendations at Gilt", Gilt Tech, Tech.Gilt. com, Jun. 6, 2011, pp. 1-4.

International Searching Authority, Written Opinion for International Application No. PCT/CA2014/050596, mailed Oct. 23, 2014.

\* cited by examiner

PRESENTATION OF PRODUCT RECOMMENDATIONS BASED ON SOCIAL INFORMATICS

BACKGROUND

The present disclosure relates to the field of computers, and specifically to the use of social groups on computers. Still more particularly, the present disclosure relates to the use of social groups to make product recommendations.

When a user is in the process of using, purchasing, leasing, or otherwise obtaining a particular product, that user relies heavily on product reviews from an unknown community. However, such reviews are often untrustworthy, since the product reviewers often 1) have different needs and expectations than the user, and/or 2) have hidden motivations for recommending a particular product, in order to influence the user's purchase.

SUMMARY

A method, system, and/or computer program product presents product recommendations based on input derived from a user's social network. A description of a product selected for purchase by a user is received. A social networking site is searched for information relevant to a characterization the product. The relevant information is characterized according to a social relationship between the user and an other member of the social networking site, a product family of the product, and a product expertise of the other member about the product. Characterized information about the product is then presented to the user.

DETAILED DESCRIPTION

Figure 1:
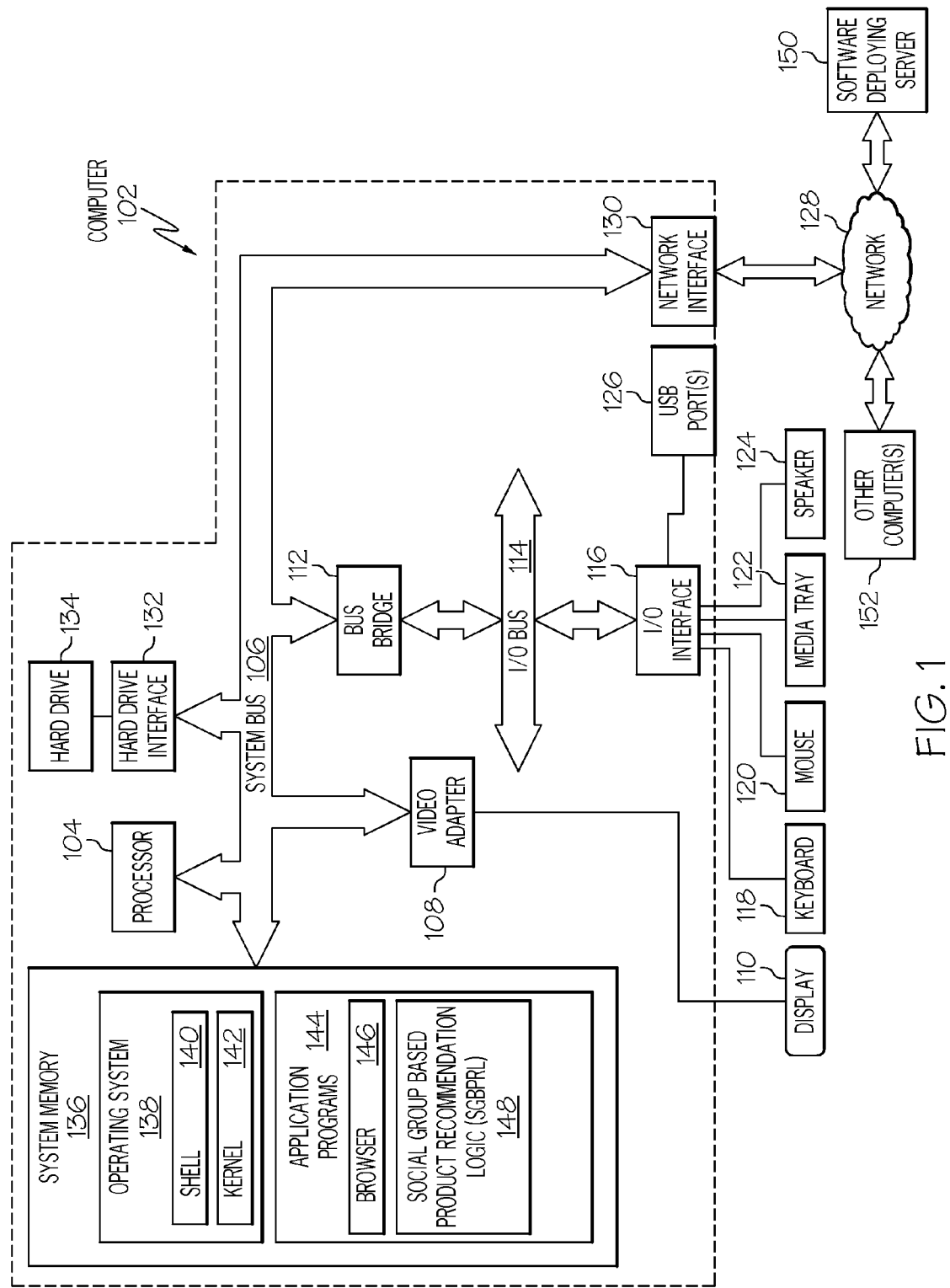
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other computer(s) 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a speaker 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems such as other computer(s) 152.

Application programs 144 in computer 102's system memory (as well as software deploying server 150's system memory) also include a social group based product recommendation logic (SGBPRL) 148. SGBPRL 148 includes code for implementing the processes described below, including those described in FIGS. 2-4. In one embodiment, computer 102 is able to download SGBPRL 148 from software deploying server 150, including in an on-demand basis, wherein the code in SGBPRL 148 is not downloaded until needed for execution. Note further that, in one embodiment of the present invention, software deploying server 150 performs all of the functions associated with the present invention (including execution of SGBPRL 148), thus freeing computer 102 from having to use its own internal computing resources to execute SGBPRL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

As described herein, the present invention pulls content from a circle/collection of friends in order to build a product/service recommendation dataset. That product/service recommendation dataset is then (1) categorized (i.e. electronics, restaurants, books, etc.). Each category is then (2) visually represented (i.e. a product circle, etc.). In one embodiment, each item in the category is (3) optionally weighted based on (i) the person who recommended the product, (ii) how recently the product was purchased or liked, (iii) the strength of the social connection/relationship of the person who recommended the product to the user, and/or (iv) the expertise of the person who recommended it. The present invention enables an aggregation and analysis of product purchases/recommendations from a user's social network along with their social strength/connection, thus enabling that user to purchase with confidence, armed with past experiences from his/her closest, known, and/or trusted friends. At the same time, individual purchase histories of the user are kept confidential and his/her identity is kept anonymous.

Figure 2:
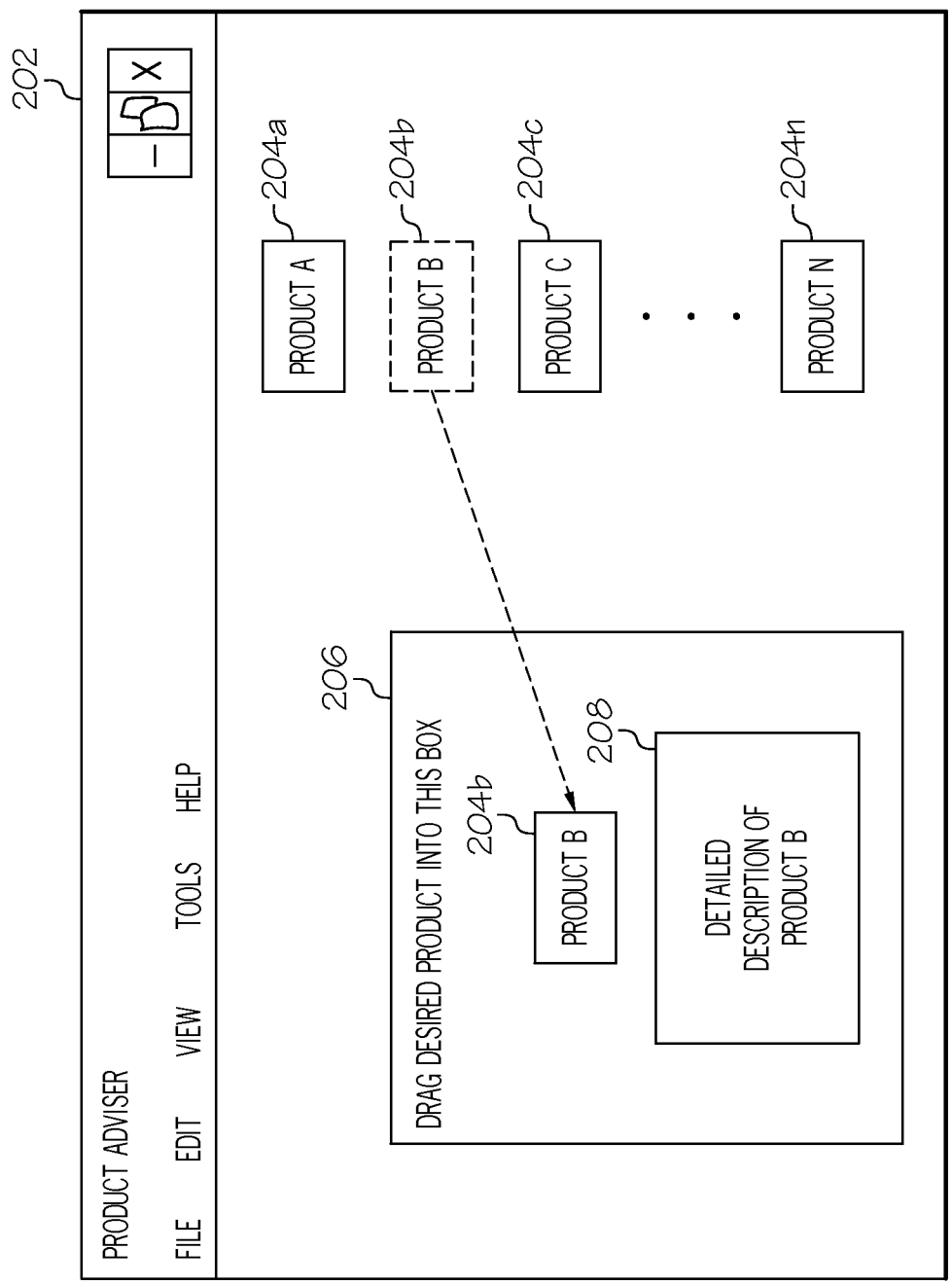
FIG. 2 illustrates an exemplary user interface that enables a user to select a desired product from a selection of products.

With reference now to FIG. 2, assume that a user is using a user interface 202 to shop for a product from an online retail store. From a selection of products 204a-204n (where "n" is an integer), the user selects Product B (204b). In one embodiment, this selection is performed by dragging an image of Product B into a selection box 206. In one embodiment, this causes a detailed description about Product B to be displayed (e.g., within description pop-up box 208).

Figure 3:
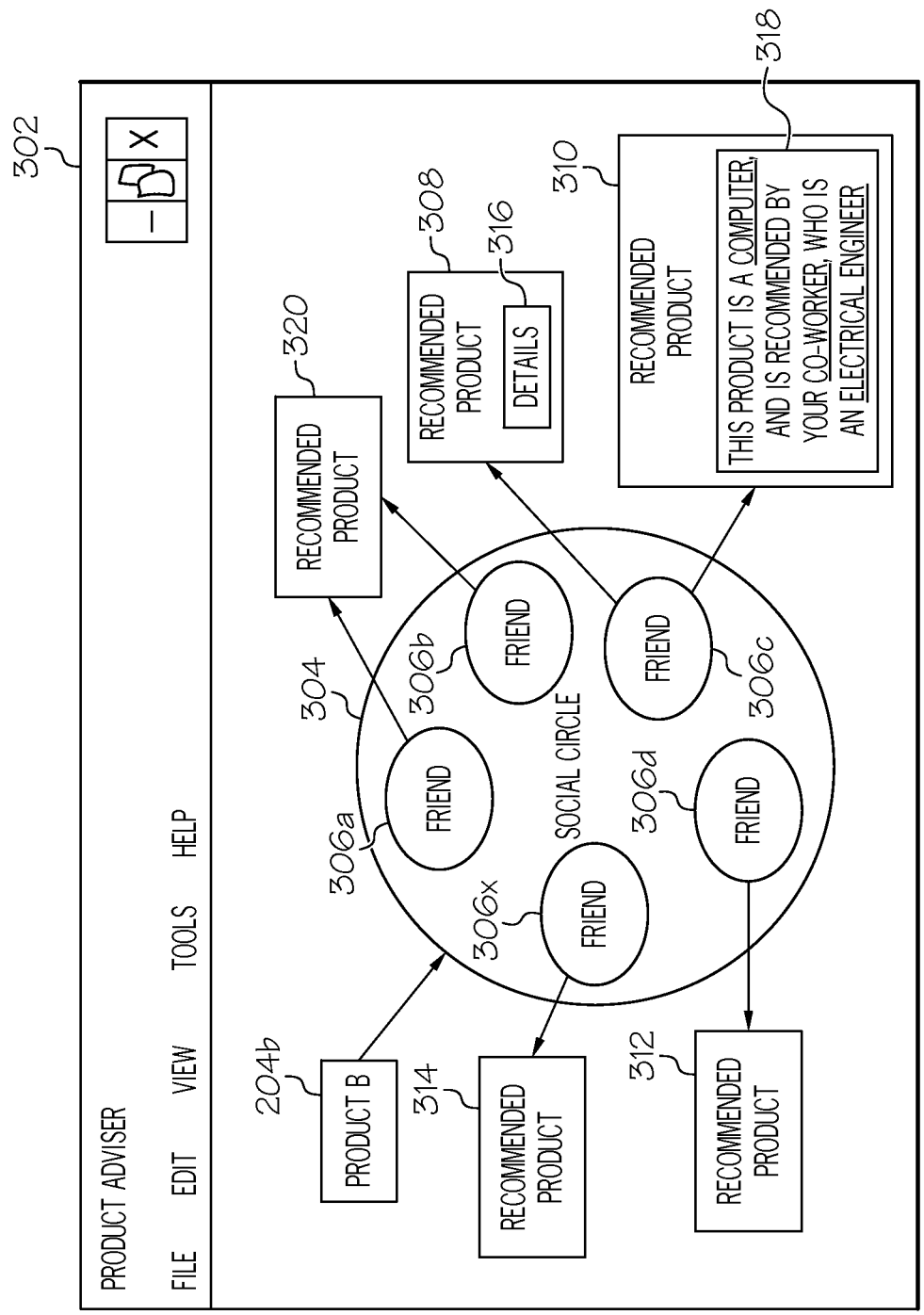
FIG. 3 depicts an exemplary user interface that depicts friends from a social circle recommending one or more products that are related to the selected product from FIG. 2.

With reference now to FIG. 3, and more specifically a user interface 302 that is pulled up by double-clicking or otherwise activating the block showing Product B (204b) in FIG. 2, Product B (204b) is now associated with a visual social circle 304 of friends of the user of the user interface 202/302. As depicted, the social circle 304 displays friends 306a-306x (where "x" is an integer), of personal friends, co-workers, persons, etc. That is, friends 306a-306x within the social circle 304 make up a group of persons who are members of a same social grouping via a social media network (e.g., an online social networking service, in which social friends and/or other persons having common interests, geographical locations, etc. are grouped together), a user-action defined group (e.g., users who subscribe to a same rich site summary (RSS) feed), a user-defined group (e.g., a user simply enters that name and network address (e.g., e-mail address) of specific persons deemed to be the user's "friends"), etc. In one embodiment, each social circle 304 is defined for a particular purpose/field. That is, a user may have one social circle of friends that are consulted when purchasing computers, another social circle of friends that are consulted when leasing computers, another social circle of friends that are consulted by purchasing/leasing non-computer items, etc. In all embodiments, the user's friends use computers (e.g., other computer(s) 152 depicted in FIG. 1) to communicate with the user via a network (e.g., network 128 depicted in FIG. 1), which is coupled to a computer (e.g., computer 102) that is being used by the user who is shopping for a product.

As depicted in FIG. 3, internal logic (e.g., SGBPRL 148 depicted in FIG. 1) identifies the category of Product B (e.g., from metatags associated with the depiction of 204b) as being a "computer". A query for recommendations about (preferably this type of) computers is sent to friends 306a-306x in the social circle 304. Each of the friends 306a-306x then provides their opinion about product B (not shown). In one embodiment, the friends 306a-306x provide recommendations about other related products that they recommend. For example, friends 306a and 306b both recommend that the shopper (i.e., user of user interface 202 shown in FIG. 2) consider recommended product 320, while friend 306x recommends recommended product 314, friend 306d recommends recommended product 312, and friend 306c recommends both recommended product 308 and recommended product 310. Note that one or more of the recommended products includes details about that product (e.g., displayed on the user interface 302 as details 316 about recommended product 308). Furthermore, detailed information about the friend who recommended a particular product is also displayed on the user interface 302 (e.g., in block 318 regarding the friend 306c who recommended the recommended product 310). Thus, as depicted in FIG. 3, similar products to product B are presented as recommended alternatives, such as the set of products 308, 310, 312, 314, and 320 based on the user's social graph, depicted as social circle 304.

Figure 4:
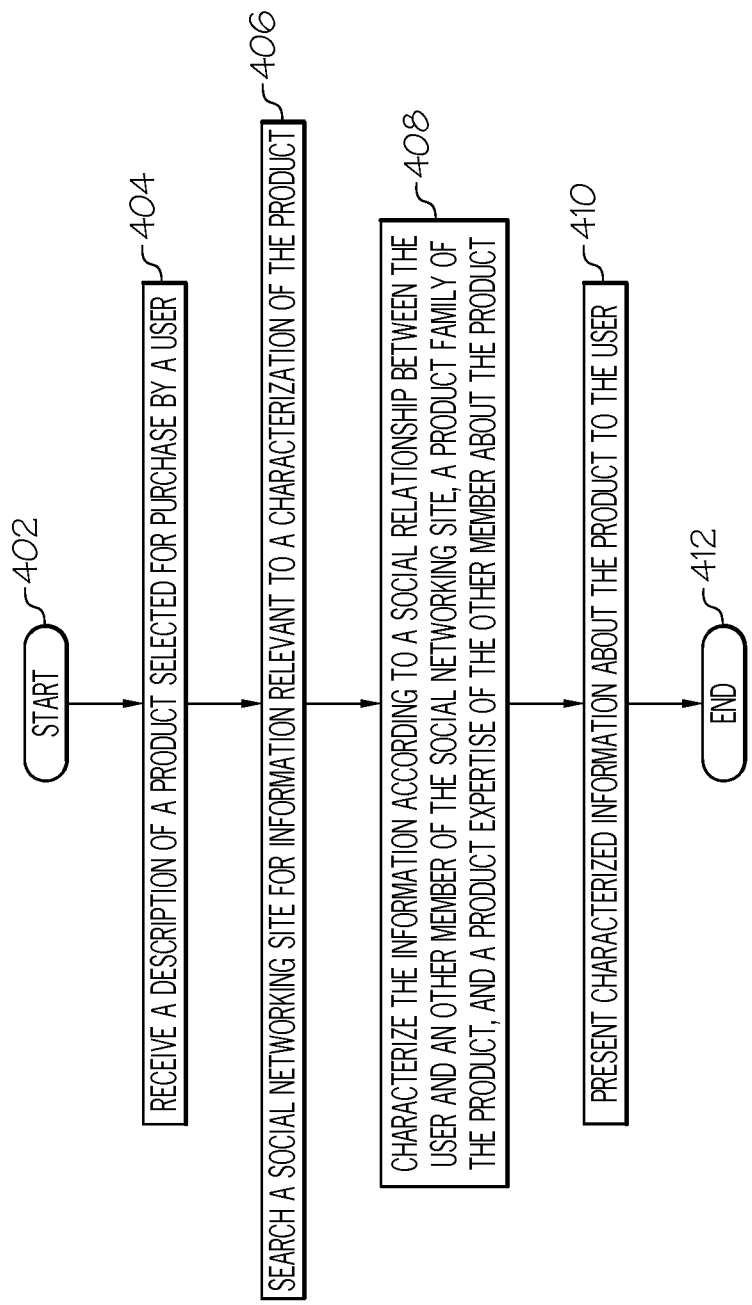
FIG. 4 is a high level flow chart of one or more exemplary steps taken by one or more processors to present product recommendations based on input derived from a user's social network.

With reference now to FIG. 4, a high level flow chart of one or more exemplary steps taken by one or more processors to present product recommendations based on input derived from a user's social network is presented. After initiator block 402, one or more processors receives a description of a product selected for purchase by a user (block 404). For example, a processor may receive an input from the user, indicating that he/she has selected a particular product to be purchased/leased/borrowed/used.

As described in block 406, one or more processors then searches a social networking site for information relevant to a characterization the product. This information, which is provided by friends of the shopper, may be about the product that was selected by the shopper/user, or it may be information about alternative products.

As described in block 408, one or more processors then characterizes this information according to a social relationship between the user and an other member of the social networking site, a product family of the product, and a product expertise of the other member about the product. That is, the information about the originally considered product and/or an alternate recommended product is characterized (e.g., weighted according to the information's significance and/or trustworthiness and/or relevance to the needs of the shopper) according to who from the social circle provided the information (a social relationship between the user and an other member of the social networking site); what type of product is being evaluated by members of the social circle (a product family of the product); and how much persons in the social circle are expected to know about this type of product (a product expertise of the other member about the product).

As described in block 410, one or more processors then present the characterized information about the product to the user (e.g., on a user interface such as user interface 302 depicted in FIG. 3). The process ends at terminator block 412.

In one embodiment of the present invention, the product being considered for purchase by the user is from a group of multiple products in a same category. For example, the user may be considering the purchase of a particular home vacuum cleaner from a group of vacuum cleaners. In this embodiment, a product recommendation for each of the vacuum cleaners (products) is weighted, such that the weighting of each product recommendation generates weighted product recommendations. In one embodiment, the weighted product recommendations are based on (i) a person who recommended a specific product, (ii) how recently the specific product was acquired by the person who recommended the specific product, (iii) a strength of a social connection between the person who recommended the specific product and the user, and/or (iv) an expertise of the person who recommended the specific product to the user. The weighted product recommendations for each of the multiple products are then aggregated to generate an aggregated weighted recommendation for each of the multiple products. For example, assume that vacuum cleaner A and vacuum cleaner B have each received five recommendations from members of a social group. Without weightings, vacuum cleaner A and vacuum cleaner B would each have a raw score of 5 (based on the five recommendations) for their respective product recommendations. However, assume that the recommendations for vacuum cleaner A are weighted more heavily than those for vacuum cleaner B, based on factors (i)-(iv) presented above. As such, vacuum cleaner A has a higher aggregated weighted recommendation relative to vacuum cleaner B, and thus vacuum cleaner A is the higher weighted product. Thus, vacuum cleaner A is presented to the user as the highest weighted product (with the highest weighted product recommendation).

In one embodiment, one or more processors receive a user selection action from the user, where the user selection action causes the product to be selected for purchase by the user. For example, in FIG. 3, if the user double clicks one of the recommended products (308, 310, etc.), this action will cause the user to be directed to an online retail service (e.g., a product page) that sells the selected product. Thus, in one embodiment, in response to the user receiving the characterized information about the product, a user selection action is received from the user. In various embodiments, the user selection action causes an action from a group consisting of adding the product to an on-line shopping cart, automatically directing the user to a product webpage that describes the product, and automatically selecting a purchase option for the user to purchase the product.

In one embodiment, one or more processors aggregate information about the product without presenting an individual purchasing history for the user. That is, although the past purchasing history of the user may or may not be considered by the computing logic when deciding which social circle should be consulted for a particular product from a line of products (i.e., a family of products that have a same and/or similar function, purpose, source (manufacturer), limitations, etc.), this information is not disclosed to 1) members of the social circle or 2) any other party, thus ensuring the confidentiality of the original shopper/user.

In one embodiment, the product originally selected by the user, and/or the product that is recommended by another member of the user's social circle, is merchandise (i.e., "goods"). In one embodiment, this product is a service (e.g., work performed on behalf of and/or to the benefit of another).

In one embodiment, one or more processors present the characterized information on a social graph. An example of this characterized information is shown in FIG. 3.

Thus, in one embodiment of the present invention and described herein, a user selects a product of interest to view more details. The product is categorized. The user's social graph is analyzed to find products of the same category purchased by the user's social network. In one embodiment, the product's category is cross referenced with other products purchased by the user's social graph. Products purchased within the user's social graph are ranked.

In one embodiment, the strength of the relationship between the user (prospective product purchaser) to the (original and/or alternate) product's recommender is considered. For example, "family" may carry the most weight, followed by "friend", followed by "coworkers". Similarly, the product recommender's expertise of the product category may be considered, as may how recently the product recommender bought the product (either the original product considered by the user or an alternate product recommended by the product recommender).

Note further that, in one embodiment, a "circle of products" rather than a "circle of friends" is depicted, such that the original product considered by the user is associated with a circle of similar products, which are then associated with persons, known to the user, who have purchased, used, or otherwise are familiar with the similar products.

Note further that, in one embodiment, the identities of the user's friends in the social graph/circle are not disclosed, in order to protect confidentiality. This keeps purchase history anonymous when people choose not to share.

Consider now the following exemplary use case in accordance with one or more embodiments of the present invention. Bob is shopping for a new computer on Website A (presented by an online retailer). Bob views a Model L laptop, which is made by Manufacturer D. By integrating Website A with Website F (a social network website), Website A may ask Website F for a circle of recommended products based on Bob's currently viewed product. Website F analyzes Bob's social graph, looking for others who have purchased computers. Bob's co-worker, Sally, recently purchased a computer. Since Sally is a Computer Engineer, Sally's purchase is returned as a highly recommended computer for Bob. Bob is presented with a (in one embodiment hierarchically ranked) list of recommended computers based on his social graph.

Thus, the present invention enables a user to be presented with product recommendations from their social network by taking into account: who in their social network has actually purchased a product; what the strength or relationship is to the social contact who has purchased a product; whether the social contact liked/disliked that product; whether the social contact's review of a product or category of product evolves over time; and whether the social contact has a history of buying in that category of products (i.e. power purchaser). Each time a user wants to buy something, he/she can use our invention to look up a product or category of products and will be presented with the reviews/recommendations from various social contacts. This evolves because people may purchase new products, update their reviews, or the strength/relationship of the user to the social contact recommending a product may change over time.

Note that the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer program product for presenting product recommendations and purchasing products, the computer program product comprising a non-transitory computer readable storage medium having program code embodied therewith, the program code readable and executable by a processor to perform a method comprising:

defining a circle of friends, wherein the circle of friends is defined for a particular purpose of recommending a particular type of product;

further defining, by one or more processors, the circle of friends based on a rich site summary (RSS) feed, wherein members of the circle of friends are all subscribers to the RSS feed;

blocking access to a purchasing history of the members of the circle of friends, wherein the members of the circle of friends are prevented from accessing a database of historical purchases made by other members of the circle of friends, and wherein computing logic uses the past purchasing history of the members of the circle of friends when defining the circle of friends to be used for recommending the particular type of product;

pulling content from a friends database describing the circle of friends to build a product recommendation dataset;

categorizing the content according to types of products;

visually representing to a user, on a first graphical user interface, each product from the types of products in a product circle;

weighting each category of the types of products based on information in the friends database that describes which friend from the circle of friends recommended said each product, how recently said each product was purchased, a strength of a social connection of a person who recommends said each product to the user, and an expertise of the person who recommends said each product to the user;

receiving a user selection on the first graphical user interface of a product from the product recommendation dataset, wherein a representation of the product is presented on the first graphical user interface, wherein the user selection is performed by the user dragging an image of the product into a selection box on the first graphical user interface, and wherein said dragging causes a detailed description of the product to be displayed on the first graphical user interface;

correlating metatags associated with the image of the product with a category of the product from the product recommendation dataset;

correlating the category of the product with a database containing entries of friend descriptors, wherein the friend descriptors describe persons having experience in purchasing products from the category of the product;

receiving an activation of the selection box, wherein activating the selection box depicts and associates each product from the product recommendation dataset with one or more members of the circle of friends on a second graphical user interface;

receiving a description of the product selected for purchase by the user;

searching a social networking site for information relevant to a characterization of the product;

characterizing the information according to a social relationship between the user and another member of the social networking site, a product family of the product, and a product expertise of the other member about the product;

presenting, on the second graphical user interface, information about each member of the circle of friends according to which product said each member recommends, wherein said information is depicted on the second graphical user interface with a visual link between the image of the product and each member of the circle of friends who recommends a particular product;

presenting the characterized information about the product to the user on the second graphical user interface; and receiving a user selection action from the user from the second graphical user interface, wherein the user selection action causes the product to be purchased by:

automatically directing the user to an online retail service;

adding the product to an on-line shopping cart; and automatically selecting a purchase option for the user to purchase the product.

2. The computer program product of claim 1, wherein the product is at least one of a merchandise and a service.

3. The computer program product of claim 1, wherein the presenting of the characterized information about the product is on a social graph.

4. The computer program product of claim 1, wherein the product is from a group of multiple products in a same category, and wherein the method performed by the processor executing the program code further comprises:

weighting each product recommendation for each of the multiple products to generate weighted product recommendations; and aggregating the weighted product recommendations for each of the multiple products to generate an aggregated weighted recommendation for each of the multiple products.

5. The computer program product of claim 4, wherein presenting characterized information about the product to the user further comprises:

identifying a highest weighted product that has a highest aggregated weighted recommendation relative to other products in the same category; and presenting the highest weighted product and the highest weighted product recommendation to the user.

6. A computer system comprising:

a processor, a computer readable memory, and a computer readable storage medium;

first program instructions to define a circle of friends, wherein the circle of friends is defined for a particular purpose of recommending a particular type of product;

second program instructions to further define, by one or more processors, the circle of friends based on a rich site summary (RSS) feed, wherein members of the circle of friends are all subscribers to the RSS feed;

third program instructions to block access to a purchasing history of the members of the circle of friends, wherein the members of the circle of friends are prevented from accessing a database of historical purchases made by other members of the circle of friends, and wherein computing logic uses the past purchasing history of the members of the circle of friends when defining the circle of friends to be used for recommending the particular type of product;

fourth program instructions to pull content from a friends database describing the circle of friends to build a product recommendation dataset;

fifth program instructions to categorize the content according to types of products;

sixth program instructions to visually represent to a user, on a first graphical user interface, each product from the types of products in a product circle;

seventh program instructions to weight each category of the types of products based on information in the friends database that describes which friend from the circle of friends recommended said each product, how recently said each product was purchased, a strength of a social connection of a person who recommends said each product to the user, and an expertise of the person who recommends said each product to the user;

eighth program instructions to receive a user selection from the first graphical user interface of a product from the product recommendation dataset, wherein a representation of the product is presented on the first graphical user interface, wherein the user selection is performed by the user dragging an image of the product into a selection box on the first graphical user interface, and wherein said dragging causes a detailed description of the product to be displayed on the first graphical user interface;

ninth program instructions to correlate metatags associated with the image of the product with a category of the product from the product recommendation dataset;

tenth program instructions to correlate the category of the product with a database containing entries of friend descriptors, wherein the friend descriptors describe persons having experience in purchasing products from the category of the product;

eleventh program instructions to receive an activation of the selection box, wherein activating the selection box depicts and associates each product from the product recommendation dataset with one or more members of the circle of friends on a second graphical user interface;

twelfth program instructions to receive a description of the product selected for purchase by the user;

thirteenth program instructions to search a social networking site for information relevant to a characterization of the product;

fourteenth program instructions to characterize the information according to a social relationship between the user and another member of the social networking site, a product family of the product, and a product expertise of the other member about the product;

fifteenth program instructions to present, on the second graphical user interface, information about each member of the circle of friends according to which product said each member recommends, wherein said information is depicted on the second graphical user interface with a visual link between the image of the product and each member of the circle of friends who recommends a particular product;

sixteenth program instructions to present the characterized information about the product to the user on the second graphical user interface; and seventeenth program instructions to receive a user selection action from the user from the second graphical user interface, wherein the user selection action causes the product to be purchased by:

automatically directing the user to an online retail service;

adding the product to an on-line shopping cart; and automatically selecting a purchase option for the user to purchase the product;

and wherein the first, second, third, fourth, fifth, sixth, seventh, eighth, ninth, tenth, eleventh, twelfth, thirteenth, fourteenth, fifteenth, sixteenth, and seventeenth program instructions are stored on the computer readable storage medium for execution by the processor via the computer readable memory.

7. The computer system of claim 6, wherein the product is at least one of a merchandise and a service.

8. The computer system of claim 6, wherein the presenting of the characterized information about the product is on a social graph.

9. The computer system of claim 6, wherein the product is from a group of multiple products in a same category, and wherein the computer system further comprises:

eighteenth program instructions to aggregate the weighted product recommendations for each of the multiple products to generate an aggregated weighted recommendation for each of the multiple products; and wherein the eighteenth program instructions are stored on the computer readable storage medium for execution by the processor via the computer readable memory.

10. The computer system of claim 9, further comprising:

nineteenth program instructions to identify a highest weighted product that has a highest aggregated weighted recommendation relative to other products in the same category; and twentieth program instructions to present the highest weighted product and the highest weighted product recommendation to the user; and wherein the nineteenth and twentieth program instructions are stored on the computer readable storage medium for execution by the processor via the computer readable memory.

* * * * *